United States Patent [19]

Slater et al.

[11] 4,007,018
[45] *Feb. 8, 1977

[54] PRODUCTION OF CLEAN SYNTHESIS OR FUEL GAS

[75] Inventors: William L. Slater, La Habra; George N. Richter, San Marino; William B. Crouch, Whittier; Lawrence E. Estabrook, Long Beach, all of Calif.

[73] Assignee: Texaco Inc., New York, N.Y.

[ * ] Notice: The portion of the term of this patent subsequent to Feb. 8, 1994, has been disclaimed.

[22] Filed: Dec. 22, 1975

[21] Appl. No.: 643,458

[52] U.S. Cl. .............................. 48/197 R; 48/200; 48/215; 252/373
[51] Int. Cl.² ...................... C10J 3/00; C10K 1/08
[58] Field of Search ........ 48/215, 212, 200, 197 R; 252/373

[56] References Cited

UNITED STATES PATENTS

| 3,620,700 | 11/1971 | Schlinger et al. | 48/215 |
| 3,639,261 | 2/1972 | Slater | 48/215 |
| 3,816,332 | 6/1974 | Marion | 48/215 |
| 3,929,429 | 12/1975 | Crouch | 48/215 |

Primary Examiner—Robert L. Lindsay, Jr.
Assistant Examiner—George C. Yeung
Attorney, Agent, or Firm—T. H. Whaley; C. G. Ries; Albert Brent

[57] ABSTRACT

An improved continuous partial oxidation process for producing clean synthesis or fuel gas from a hydrocarbonaceous fuel feed is disclosed wherein hot gases from the process are simultaneously cooled and cleaned by direct contact with hydrocarbon oil. Thus, the effluent gas stream from the reaction zone of the gas generator is cooled and cleaned by discharging the gas stream directly into a relatively large body of hot liquid hydrocarbon immersion fluid. For example, the immersion fluid may be a dispserion of liquid hydrocarbonaceous fuel such as petroleum oil and particulate carbon which is contained in a separate immersion vessel. A portion of the immersion fluid is continuously removed from the immersion vessel and is cooled in an external cooler to a temperature in the range of about 300 to 850° F but above the dew point of the water in the process gas stream. Portions of the cooled immersion fluid optionally in admixture with scrubbing fluid obtained subsequently in the process are recycled to the immersion vessel, and optionally to the gas generator as at least a portion of the hydrocarbonaceous fuel feed. In another emnbodiment, a portion of the immersion fluid removed from the immersion vessel may be introduced into the gas generator as at least a portion of the feed without first being passed through a cooler. The effluent gas stream leaving said immersion zone may be subjected to additional cleaning by being scrubbed with said scrubbing fluid comprising make-up hydrocarbonaceous fuel and particulate carbon in a separate scrubbing zone. The clean product gas comprises $H_2$, $CO$, $CO_2$, $H_2O$ and, optionally at least one material from the group $H_2S$, $COS$, $N_2$, $A$, and $C_1 - C_{10}$ hydrocarbons.

13 Claims, 1 Drawing Figure

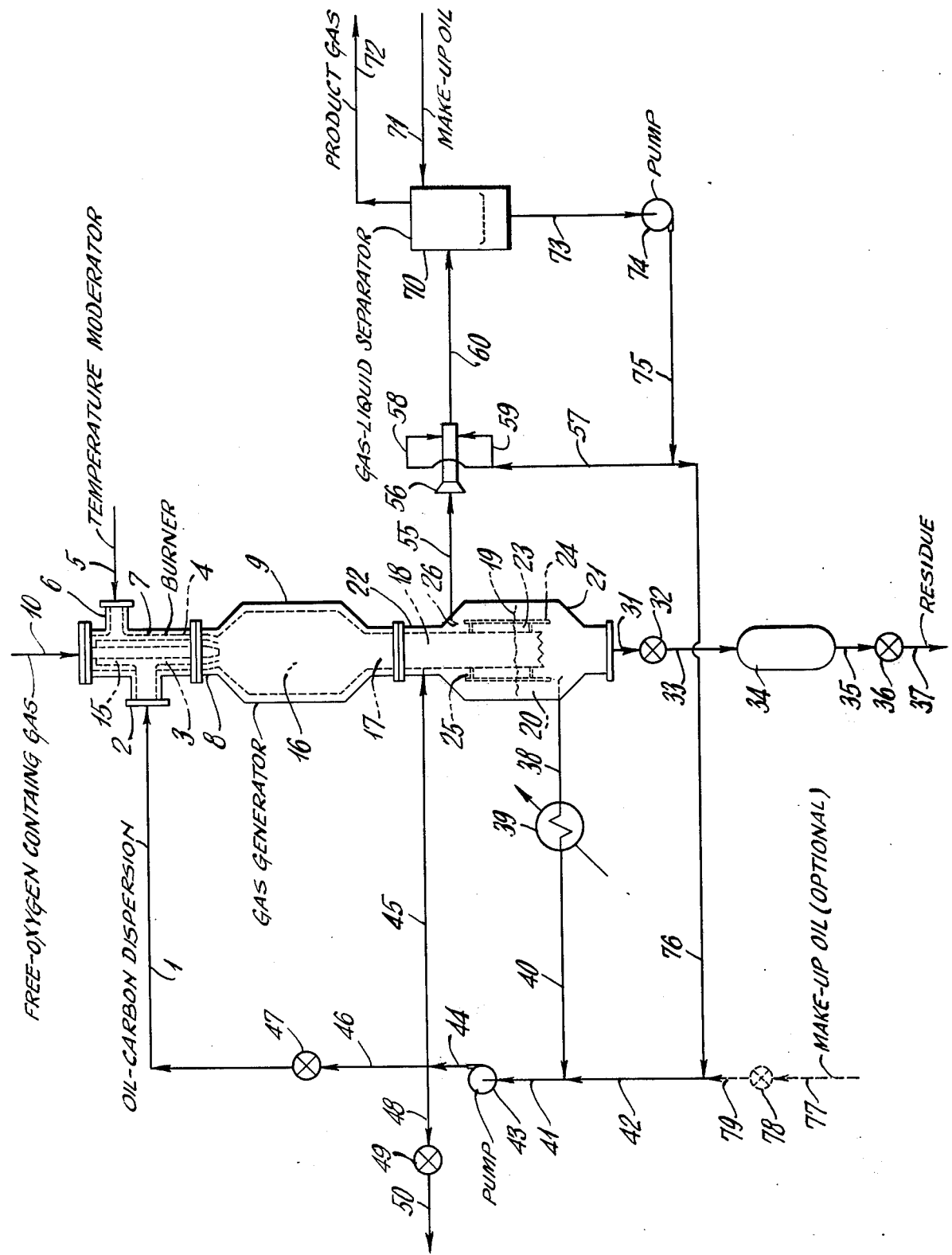

PRODUCTION OF CLEAN SYNTHESIS OR FUEL GAS

BACKGROUND OF THE INVENTION

1. Field of the Invention

This invention relates to a continuous process for the production of fuel gas or synthesis gas by the partial oxidation of a hydrocarbonaceous fuel. More specifically, the present invention pertains to an improved procedure for producing cooled and cleaned gas mixtures comprising hydrogen and carbon monoxide.

2. Description of the Prior Art

Liquid hydrocarbon fuels have been gasified with oxygen in the presence of steam to produce a mixture of gaseous products comprising carbon monoxide and hydrogen. For example, reference is made to coassigned U.S. Pat. No. 2,809,104 - D. M. Strasser et al., where the effluent gas stream from the reaction zone is cooled by quenching in water. Scrubbing a precooled gas stream with an oil-water emulsion containing about 10 to 90 volume % water is described in coassigned U.S. Pat. No. 3,010,813 - L. A. Clarke et al.

By quenching the effluent gas stream in water or in emulsions containing large amounts of water, large amounts of $H_2O$ will be introduced into the gas stream which may be costly to remove. Further, dispersions of particulate carbon and water are produced which require complex systems to separate the carbon from the water.

By the subject invention traditional costly carbon removal systems may be eliminated and the waste water treatment facilities now required to meet water disposal standards may be simplified.

SUMMARY

The subject invention pertains to a continuous process for producing clean synthesis or fuel gas mixtures comprising $H_2$, CO, $CO_2$, $H_2O$ and optionally at least one material from the group $H_2S$, COS, $N_2$, A, and $C_1$–$C_{10}$ hydrocarbons. The process steps include the following:

1. introducing into the reaction zone of a freeflow unpacked gas generator as feed a liquid dispersion of particulate carbon and liquid hydrocarbonaceous fuel, a stream of free-oxygen-containing gas, and optionally a temperature moderator, and reacting said materials at a temperature in the range of about 1300° to 3000° F and a pressure in the range of about 1 to 250 atmospheres, thereby producing an effluent gas stream comprising $H_2$, CO, $CO_2$, $H_2O$, particulate carbon, and optionally at least one material from the group $H_2S$, COS, $N_2$, A, and $CH_4$;
2. cooling the effluent gas stream from (1) to a temperature in the range of about 300° to 900° F but above the dew point of water in said gas stream and simultaneously removing said particulate carbon entrained in said gas stream by discharging said effluent gas stream directly into a body of hot immersion fluid contained in a quench zone and comprising a dispersion of liquid hydrocarbonaceous fuel and particulate carbon, and removing from said quench zone a clean gaseous stream comprising $H_2$, CO, $CO_2$, $H_2O$, and optionally at least one material from the group particulate carbon, $H_2S$, COS, $N_2$, A, and $C_1$ – $C_{10}$ hydrocarbons;
3. cooling at least a portion of the hot immersion fluid from (2) to a temperature in the range to about 300° to 850° F in an external cooler and recycling at least a portion of said cooled immersion fluid to said quench zone; and
4. introducing a portion of said hot immersion fluid from (2) or a portion of said cooled immersion fluid from (3) into said gas generator as at least a portion of said feed.

Optionally, the effluent gas stream from the quench zone in step (2) may be subjected to additional cleaning using a nozzle scrubber at a temperature above the dew point of the water in the gas stream and with a scrubbing fluid that may have substantially the same ultimate analysis as the immersion fluid. Product gas is then separated from the scrubbing fluid. The used scrubbing fluid may be recovered and a first portion may be recycled to the nozzle scrubber while a second portion may be mixed with the immersion fluid in step (3) that is recycled to the quench zone and to the gas generator.

$C_1$ – $C_{10}$ hydrocarbon vapors may be obtained by thermal cracking or volatilizing a portion of the immersion fluid during quenching of the hot process gas stream in the quench zone. Water and $C_5$ – $C_{10}$ hydrocarbon vapors that may be entrained in the product gas stream may be condensed by cooling and thereby separated from the product gas stream.

DESCRIPTION OF THE INVENTION

By the present process, cooled and cleaned synthesis gas or fuel gas may be produced.

The gas generator for carrying out the partial oxidation reaction in the subject process preferably consists of a compact, unpacked, free-flow, noncatalytic, refractorylined steel pressure vessel of the type described in said coassigned U.S. Pat. No. 2,809,104 to Dale M. Strasser et al.

The feed streams may be simultaneously introduced into the gas generator by means of a suitable mixer. For example, by means of a typical burner, the separate streams of reactants are brought together to produce a uniform mixture which is then reacted by partial oxidation in the reaction zone of the gas generator. The burners consist in general of a plurality of concentrically arranged tubes. At the burner tip, the reactant streams converge to form a mist of finely dispersed fuel particles in free-oxygen containing gas and temperature moderator.

Suitable single annulus-type burners are described in coassigned U.S. Pat. No. 2,928,460 - DeBois Eastman et al; and suitable double annulus-type burners are described in coassigned U.S. Pat. No. 3,847,564. The burner is preferably mounted in the upper port of the gas generator along the vertical axis with the tip of the burner extending into the reaction zone.

The reaction time in the gas generator is in the range of about 1 to 10 seconds and preferably in the range of about 2 to 8 seconds.

A free-oxygen-containing gas is introduced into the reaction zone of the gas generator, preferably by way of the center passage of the burner. The term "free-oxygen containing gas" as used herein is intended to include air, oxygen-enriched air, i.e. at least 22 mole % oxygen, and substantially pure oxygen, i.e. at least 95 mole % oxygen (the remainder comprising $N_2$ and rare gases).

The free-oxygen containing gas is introduced into the reaction zone at a temperature in the range of about ambient to 1800° F. and preferably in the range of about 200° to 300° F., and a pressure in the range of about 1 to 250 atmospheres. The ratio of free-oxygen in the oxidant to to carbon in the feedstock (O/C atom/atom) is in the range of about 0.6 to 1.5. Substantially pure oxygen is preferred to minimize introducing nitrogen and other gaseous impurities into the product gas.

The term "liquid hydrocarbonaceous fuel" as used herein is intended to mean by definition petroleum distillate and residua, gas oil, residual fuel, reduced crude, whole crude, asphalt, coal tar, coal oil, shale oil, tar sand oil, and mixtures thereof. Thermally cracked and vaporized constituents thereof which are normally liquid $C_5 - C_{10}$ hydrocarbons are also by definition "liquid hydrocarbonaceous fuel." An economic advantage is obtained when low cost sulfur-containing petroleum oils with a sulfur content in the range of about 1 to 7 weight % are used.

Pumpable slurries of solid carbonaceous fuels, e.g. particulate carbon, petroleum coke, and mixtures thereof in a liquid hydrocarbonaceous fuel such as one previously listed, may also be fed to the gas generator and are included within the definition of liquid hydrocarbonaceous fuel.

The liquid hydrocarbonaceous fuel may be preferably introduced into the gas generator in a liquid phase at a temperature in the range of ambient to below the vaporization temperature. Alternately, the hydrocarbonaceous fuel feed may be atomized and dispersed in steam or some other temperature moderator.

The term "temperature moderator" as used herein includes by definition $H_2O$, $CO_2$, flue gas, a portion of cooled and recycled effluent gas from the synthesis gas generator, and mixtures thereof. Water is the preferred temperature moderator. Water is preferably supplied in liquid phase, but it may be introduced as steam. The weight ratio of temperature moderator to liquid hydrocarbonaceous fuel is in the range of about 0.0 to 3.0 and preferably about 0.25 to 0.75. The temperature moderator may be introduced into the reaction zone through a separate passage in the burner, e.g. outer annular passage. Alternatively, it may be introduced in admixture with either the free-oxygen containing gas, the liquid hydrocarbonaceous fuel, or both.

The effluent gas stream from the gas generator has the following composition in mole %: $H_2$ 10 to 60; CO 10 to 70; $CO_2$ 1 to 50; $H_2O$ 2 to 50; $CH_4$ nil to 30; $N_2$ nil to 75; $H_2S$ nil to 2.0; COS nil to 0.7; A nil to 2; and from 0.2 to 20 weight % of particulate carbon (basis weight of C in the hydrocarbonaceous fuel).

The effluent gas stream leaving the gas generator is passed directly into a relatively large body of pumpable immersion fluid contained in a cooling and cleaning zone. The immersion fluid comprises a liquid hydrocarbonaceous fuel and may contain dispersed particulate carbon.

In a preferred embodiment the process gas stream is introduced below the surface of a pool of liquid hydrocarbonaceous fuel-particulate carbon dispersion contained in an immersion or quench tank. The oil immersion tank preferably comprises a vertical tank with an axially disposed dip leg. The process gas stream is passed through the dip leg and is discharged beneath the surface of a pool of the liquid hydrocarbonaceous fuel contained in the steel pressure vessel. A concentric draft tube open on both ends may surround the dip leg, producing an annulus passage therebetween. In operation, the direction of the downflowing process gas stream may be reversed thereby and a mixture of gas and cooling fluid may then pass up through said liquid hydrocarbon. The gas then separates in the space above the surface level of the immersion fluid near the top of the oil immersion tank. About 30 to 60 gallons of immersion fluid are contained in the immersion tank for each 1000 Standard Cubic Feet of effluent gas from the gas generator that is quenched therein.

The turbulent condition in the oil immersion tank, caused by the large volumes of gases bubbling up through said annular space, helps the immersion fluid to scrub substantially all of the solids from the effluent gas, forming a dispersion of unconverted particulate carbon and immersion fluid. Thus, as used herein, the term "immersion fluid" is intended to mean either the mixtures of liquid hydrocarbonaceous fuels or a pumpable dispersion of liquid hydrocarbonaceous fuels and particulate carbon. The solids content in weight % of this oil - carbon pumpable dispersion is in the range of about nil to 50.0 and preferably in the range of about 2.0 to 8.0. For a detailed description of a conventional quench chamber, reference is made to coassigned U.S. Pat. No. 2,896,927 - R.E. Nagle et al., which is herewith incorporated by reference.

The cooled clean process gas stream leaving the immersion fluid has an exit temperature in the range of about 300° to 900° F., and preferably a temperature in the range of about 600° to 750° F. The lower temperature should be above the dew point of water to prevent water from condensing out of the process gas stream. The time in the immersion zone is about 5 to 60 seconds. The effluent gas stream leaving the immersion zone comprises $H_2$, CO, $CO_2$, $H_2O$, and optionally at least one material from the group $H_2S$, COS, $N_2$, A, particulate carbon, and $C_1 - C_{10}$ hydrocarbons. There may be about nil to 40 mole % of $C_1 - C_{10}$ hydrocarbons which may result from thermal cracking or volatilization of the immersion fluid.

The immersion fluid may be maintained at a temperature in the range of about 300° to 850° F and preferably about 600° to 750° F. The pressure in the quench zone is in the range of about 1 – 250 atmospheres and preferably the same as in the gas generator. A pressure in the range of about 3 to 250 atmospheres is suitable. When it is desirable to minimize volatilization of the immersion fluid, higher pressures may be used, i.e. 1500 psia and above. To minimize $C_1 - C_4$ hydrocarbons in the product gas, the upper temperature of the immersion fluid should be kept below the thermal cracking temperature. Optionally, a portion of the hot immersion fluid may be removed from the immersion tank at a temperature in the range of about 300° to 850° F and at substantially the same temperature may be introduced into the gas generator as feed thereto. In this manner the immersion tank serves as a fuel preheater.

The liquid hydrocarbon immersion fluid is pumpable at the operating conditions existing in the quench tank. The liquid hydrocarbonaceous fuels which were previously described as feedstock for the gas generator, and the immersion fluid are substantially the same type of materials.

The temperature of the immersion fluid may be controlled by the steps of continuously removing a portion of the hot immersion fluid from the quench tank, cooling it, and recycling to the quench tank a portion of said cooled immersion fluid optionally in admixture with a liquid dispersion comprising particulate carbon, make-up liquid hydrocarbonaceous fuel, and any condensed $C_5 - C_{10}$ hydrocarbons. This liquid dispersion may be obtained from subsequent gas scrubbing and gas-liquid, separation steps. Optionally, a portion of the cooled immersion fluid may be recycled to the gas generator as feed. Optionally, a portion of the immersion fluid may be removed from the system and burned elsewhere as fuel.

Cooling of the hot immersion fluid that is removed from the bottom of the quench tank may be effected in a cooler.

At start-up, the immersion fluid may have to be heated by conventional means to a temperature that is above the dew point for $H_2O$ in the effluent gas stream from the gas generator.

Solid materials, such as ash and heavy metal constituents, i.e. nickel and vanadium, and their reaction products are periodically removed from the bottom of the oil immersion tank by way of a conventional lock hopper system such as described in coassigned U.S. Pat. No. 3,544,291 - W. Schlinger et al, or by filtration.

The cleaned and cooled process gas stream leaving from the top of the oil immersion tank is at a temperature in the range of about 300° to 900° F, and preferably about 600° to 750° F.

Residual solids contained in the gas stream may be removed by passing the gas stream through a nozzle scrubber. A conventional orifice or venturi scrubber may be employed. The pumpable scrubbing fluid comprises liquid hydrocarbonaceous fuel make-up in admixture with nil to 50 weight percent of particulate carbon, and any condensed liquid liquid hydrocarbons in the range $C_5 - C_{10}$ that may be present. For example, the process gas stream may be passed through the throat of a nozzle-type scrubber at a velocity in the range of about 100 – 400 feet per second. About 5 to 10 gallons of scrubbing fluid per 1,000 standard cubic feet are injected into the process gas stream at the throat of the scrubbing nozzle.

In a gas-liquid separator the product gas may be separated from the normally liquid constituents in the scrubbed gas stream.

The product gas leaving the gas-liquid separator may contain from about nil to 40 mole percent of $C_1 - C_{10}$ saturated and unsaturated hydrocarbons due to cracking or vaporization of the immersion fluid. Other gaseous constituents include $H_2$, CO, $CO_2$, and optionally gaseous impurities selected from the group $H_2O$, $N_2$, A, $H_2S$, COS, and mixtures thereof. For example, synthesis gas product may preferably contain up to 5 mole % $C_1 - C_{10}$ hydrocarbons, while fuel gas may preferably contain from 10 to 40 mole % of $C_1 - C_{10}$ hydrocarbons. The greater the amount of $C_1 - C_{10}$ hydrocarbons present, the higher the heating value of the product gas. Thus, for the same oxygen consumption in the gas generator, fuel gas may be produced by the subject process having a greater heating value i.e. B.T.U. per standard cubic feet (SCF) in the range of 400 to 800.

The amount of $C_1 - C_{10}$ hydrocarbons in the product gas is a function of the characteristics of the immersion fluid, and the temperature of the immersion fluid. Thermal cracking of the immersion fluid should be controlled or minimized when synthesis gas is produced. In such case refractory oils such as residual aromatic oils, high flow rates, and low quench temperatures i.e. 300° to 500° F are preferred operating conditions. However, when the product gas is fuel gas, some thermal cracking of the immersion fluid in the immersion zone is preferred to increase the heating value of the gas.

If desired, additional conventional gas purification steps such as by solvent absorption or cryogenic cooling may be employed to eliminate any or all of the gaseous impurities from the product gas stream. For example, the product gas leaving the gas-liquid separator may be cooled to condense out water or a mixture of water and at least part of the $C_5 - C_{10}$ hydrocarbons.

The pumpable scrubbing fluid in liquid phase separates by gravity from the product gas in the gas-liquid separator. As previously mentioned, a first portion of the scrubbing fluid is recycled to the nozzle scrubber; and a second portion is mixed with the hot or cooled immersion fluid. A first portion of the later mixture is recycled to the quench tank to maintain the level of the immersion fluid; and a second portion is introduced into the gas generator as feedstock by way of the burner. Optionally, a third portion may be removed and used elsewhere in the system as fuel.

Advantages of the subject process include: (1) elimination of the conventional carbon extraction facility employing naphtha for extracting carbon from carbon-water slurries followed by decanting and naphtha stripping; (2) production of synthesis gas or enriched fuel gas having a high B.T.U. per SCF; and (3) increased thermal efficiency by employing heat from the effluent gas from the gas generator to preheat the oil feed to the gas generator.

DESCRIPTION OF THE DRAWING AND EXAMPLE

A more complete understanding of the invention may be had by reference to the accompanying schematic drawing which shows the previously described process in detail. Quantities have been assigned to various streams so that the following description in Example I may also serve as an example of the subject invention.

EXAMPLE I

On an hourly basis about 2000 lbs. of an oilcarbon feed dispersion in line 1 at a temperature of about 300° F. is passed through inlet 2 and inner annulus passage 3 of burner 4. Simultaneously, about 1200 lbs. of steam at a temperature of about 650° F. in line 5 is passed through inlet 6 and outer annulus passage 7. Alternatively, a single annulus burner (not shown) may be employed to introduce the feed streams. In such case the steam from line 5 and the oil-carbon dispersion from line 1 may be mixed together and the mixture is passed through the annular passage in the burner. Burner 4 extends axially into upper flanged port 8 of conventional, vertical, free-flow, unpacked, noncatalytic, refractory-lined gas generator 9. The oil-carbon dispersion has a solids content of about 3.6 weight percent (wt. %) of particulate carbon. The oil in said dispersion comprises 15.0° API California Reduced Crude having the following ultimate analysis in wt. %: C 85.99; H 11.28; O 0.13; N 0.88, S 1.69 and Ash 0.03. The Heat of Combustion of the oil is 18,514 BTU per lb.

Simultaneously, 2135 lbs. of substantially pure oxygen in line 10 at a temperature of about 300° F is passed through central passage 15 of burner 4. The reactant streams converge at the tip of the burner where atomization of the fuel and dispersal in the oxidant takes place.

In reaction zone 16 of refractory lined gas generator 9, at an autogenous temperature of about 2260° F and a pressure of about 28 atmospheres, partial oxidation of the fuel takes place. 121,700 standard cubic feet per hour (SCFH) of effluent gas leave the gas generator by way of axially located bottom flanged exit port 17 and directly passes down through dip tube 18 and is discharged below the surface 19 of the pool of oil-carbon dispersion 20 contained in vertical oil immersion vessel 21. Dip tube 18 is axially mounted in the top flanged inlet port 22. The direction of the process gas stream moving down dip tube 18 is reversed upon being discharged into the immersion fluid confined in vessel 21. The gas stream then passes vigorously up through the scrubbing fluid contained in the annular space 23 located between the outside surface of dip tube 18 and inside surface of openended concentric draft tube 24. Spacers 25 support draft tube 24 and positions it with respect to dip tube 18. The turbulent action cools and cleans the process gas stream which then separates from the immersion fluid in space 26 at the top of the immersion vessel at a temperature of about 500° F. The pressures in the immersion vessel and in the gas generator are substantially the same.

Solid residue, such as ash and heavy metal constituents, which separates from the gas stream sinks to the bottom of the oil-carbon dispersion in vessel 21 and is periodically removed through bottom axial flanged port 30. A conventional lock hopper system comprising line 31, valve 32, line 33, tank 34, line 35, valve 36 and line 37 facilitate the removal of the solids.

The temperature of the immersion fluid 20 is reduced by removing 39,000 lbs. of the immersion fluid at a temperature of about 500° F and containing about 4.0 wt. % of particulate carbon through line 38. It is then passed through cooler 39 and lines 40-41. About 2000 lbs. of scrubbing fluid from line 42 coming from a downstream gas scrubbing step to be further described, are mixed in line 41 with said cooled immersion fluid from line 40. By means of pump 43, about 39,000 lbs. of this mixture of fluids at a temperature of about 300° F are pumped through lines 44 and 45 into the top of immersion vessel 21 as said immersion fluid. About 2000 lbs of the mixture of fluids in line 44 are passed through line 46, valve 47, line 1, and nozzle 2 into burner 4 as the liquid hydrocarbonaceous fuel feed to gas generator 9. Alternately, cooler 39 may be placed in line 45. In such instance, a portion of the hot mixture of fluids in line 44 may be introduced, without being substantially cooled, into gas generator 9 as at least a portion of the feed. Optionally, a portion of the mixture of fluids in line 44 may be passed through line 48, valve 49, and line 50 and used for heating fuel.

The process gas stream is removed from space 26 at the top of immersion vessel 21 and is passed through line 55 into conventional nozzle scrubber 56 where it is scrubbed with 6200 lbs. of scrubbing fluid from lines 57 − 59. The process gas stream, in admixture with the scrubbing fluid is then passed through line 60 into gas-liquid separator 70 where the product gas separates, passes through a spray stream of clean make-up California Reduced Crude Oil from line 71 at ambient temperature. Clean product gas is removed through line 72 at the top of separator 70. In this example there are substantially no $C_2 - C_{10}$ hydrocarbons in the product gas stream. This is because the temperature of the immersion fluid in immersion vessel 21 is maintained below the thermal cracking temperature and below the vaporization temperature for the existing pressure. The composition of the product gas in line 72 in mole % dry basis follows: $H_2$ 48.12; CO 44.99; $CO_2$ 5.89; $CH_4$ 0.33; $H_2S$ 0.36; COS 0.02; $N_2$ 0.22; and A 007.

A pumpable liquid dispersion scrubbing fluid comprising make-up oil, and 0.25 wt. % of particulate carbon is removed through line 73 at the bottom of separator 70. By means of pump 74, a first portion is passed through lines 75 and 57 into nozzle scrubber 56. A second portion of the nozzle scrubbing fluid is passed into line 42 and mixed in line 41 with the immersion fluid from line 40, as previously described.

The process of the invention has been described generally and by example with reference to an oil feedstock of particular composition for purposes of clarity and illustration only. It will be apparent to those skilled in the art from the foregoing that various modifications of the process and the materials disclosed herein can be made without departure from the spirit of the invention.

We claim:

1. A continuous process for producing clean synthesis or fuel gas comprising:
    1. Introducing into the reaction zone of a freeflow, unpacked gas generation zone as feed materials a dispersion of particulate carbon in liquid hydrocarbonaceous fuel, a stream of free-oxygen-containing gas selected from the group consisting of air, oxygen-enriched air i.e. at least 22 mole % oxygen, and substantially pure oxygen i.e. at least 95 mole % oxygen, wherein the ratio of free-oxygen in the free-oxygen containing gas to carbon in the feedstock (O/C atom/atom) is in the range of about 0.6 to 1.5, and optionally a temperature moderator selected from the group consisting of $H_2O$, $CO_2$, flue gas, a portion of cooled and recycled effluent gas from the gas generator, and mixtures thereof, and reacting said feed materials by partial oxidation at a temperature in the range of about 1300° to 3000° F and a pressure in the range of about 1 to 250 atmospheres, thereby producing an effluent gas stream containing $H_2$, CO, $CO_2$, $H_2O$, particulate carbon, and optionally at least one gas from the group $H_2S$, COS, $N_2$, A and $CH_4$;
    2. cooling the effluent gas stream from (1) to a temperature in the range of about 300° to 900° F but above the dew point of water in said gas stream and simultaneously removing said entrained particulate carbon by discharging said effluent gas stream directly into a body of hot immersion fluid contained in a quench zone and comprising a dispersion of liquid hydrocarbonaceous fuel and particulate carbon, and removing from said quench zone a clean gaseous stream comprising $H_2$, CO, $CO_2$, $H_2O$ and optionally at least one material from the group particulate carbon, $H_2S$, COS, $N_2$, A, and $C_1 - C_{10}$ hydrocarbons;
    3. cooling at least a portion of the hot immersion fluid from (2) to a temperature in the range of about 300° to 850° F in an external cooler and recycling at least a portion of the cooled immersion fluid to said quench zone; and (4) introducing a portion of said hot immersion fluid from (2) or a portion of said cooled immersion fluid from (3) into said gas generation zone in (1) as at least a portion of said dispersion of particulate carbon in liquid hydrocarbonaceous fuel.

2. The process of claim 1 wherein said liquid hydrocarbonaceous fuel is selected from the group consisting of petroleum distillate and residua, gas oil, residual fuel, reduced crude, whole crude, asphalt, coal tar, coal oil, shale oil, tar sand oil, and the mixtures thereof.

3. The process of claim 1 wherein said liquid hydrocarbonaceous fuel is a pumpable slurry of solid carbonaceous fuel.

4. The process of claim 1 wherein said temperature moderator is selected from the group consisting of $H_2O$, $CO_2$, flue gas, a portion of cooled and recycled effluent gas from the gas generator, and mixtures thereof.

5. The process of claim 1 wherein said free-oxygen containing gas is selected from the group air, oxygen-enriched air i.e. at least 22 mole % oxygen, and substantially pure oxygen i.e. at least 95 mole % oxygen.

6. The process of claim 1 wherein the weight ratio of temperture moderator to liquid hydrocarbonaceous fuel is in the range of about 0.0 to 3.0.

7. The process of claim 1 wherein the immersion fluid in step (2) is a pumpable dispersion of liquid hydrocarbonaceous fuel and carbon particles in which the solids content is in the range of about nil to 50 weight percent.

8. The process of claim 10 wherein said product gas contains from 10 to 40 mole % of $C_1$-$C_{10}$ hydrocarbons and has a gross heating value in the range of about 400 to 800 BTU per Standard Cubic Feet.

9. The process of claim 1 wherein said quench zone contains 30 to 60 gallons of immersion fluid maintained at a temperature in the range of about 300° to 850° F for each 1000 Standard Cubic Feet of effluent gas from the gas generator that is directly quenched therein.

10. A continuous process for producing clean synthesis or fuel gas comprising:
 1. introducing into the reaction zone of a freeflow, unpacked gas generation zone as feed materials a dispersion of particulate carbon in liquid hydrocarbonaceous fuel, a stream of free-oxygen-containing gas selected from the group consisting of air, oxygen-enriched air i.e. at least 22 mole % oxygen, and substantially pure oxygen i.e. at least 95 mole % oxygen, wherein the ratio of free-oxygen in the free-oxygen containing gas to carbon in the feedstock (O/C atom/atom) is in the range of about 0.6 to 1.5; and optionally a temperature moderator selected from the group consisting of $H_2O$, $CO_2$, flue gas, a portion of cooled and recycled effluent gas from the gas generator, and mixtures thereof, and wherein the weight ratio of temperature moderator to liquid hydrocarbonaceous fuel is in the range of about 0.0 to 3.0; and reacting said feed materials by partial oxidation at a temperature in the range of about 1300° to 3000° F and a pressure in the range of about 1 to 250 atmospheres, thereby producing an effluent gas stream containing $H_2$, CO, $CO_2$, $H_2O$, particulate carbon, and optionally at least one gas from the group $H_2S$, COS, $N_2$, A and $CH_4$;
 2. cooling the effluent gas stream from (1) to a temperature in the range of about 300° to 900° F but above the dew point of water in said gas stream and simultaneously removing said entrained particulate carbon by discharging said effluent gas stream directly into a body of hot immersion fluid contained in a quench zone and comprising a dispersion of liquid hydrocarbonaceous fuel and particulate carbon wherein said quench zone contains 30 to 60 gallons of immersion fluid maintained at a temperature in the range of about 300° to 850° F for each 1000 Standard Cubic Feet of effluent gas from the gas generator that is quenched therein; and removing from said quench zone a clean gaseous stream comprising $H_2$, CO, $CO_2$, $H_2O$ and optionally at least one material from the group particulate carbon, $H_2S$, COS, $N_2$, A, and $C_1$ – $C_{10}$ hydrocarbons;
 3. cooling at least a portion of the hot immersion fluid from (2) to a temperature in the range of about 300° to 850° F in an external cooler and recycling at least a portion of the cooled immersion fluid to said quench zone;
 4. introducing a portion of said hot immersion fluid from (2) or a portion of said cooled immersion fluid from (3) into said gas generation zone in (1) as at least a portion of said dispersion of particulate carbon in liquid hydrocarbonaceous fuel;
 5. removing any remaining particulate carbon in the gas stream from step (2) by scrubbing said gas stream in a gas scrubbing zone with a scrubbing fluid comprising a dispersion of liquid hydrocarbonaceous fuel and particulate carbon;
 6. introducing the effluent stream of gas and scrubbing fluid from said gas scrubbing zone into a gas-liquid separator and separating a gaseous stream from said scrubbing fluid and contacting said gaseous stream with fresh make-up liquid hydrocarbonaceous fuel, and removing clean product gas and a separate stream of scrubbing fluid from said gas-liquid separator; and
 7. recycling a first portion of said scrubbing fluid to said gas scrubbing zone, and mixing a second portion of said scrubbing fluid with a portion of immersion fluid being recycled in steps (3) and (4).

11. The process of claim 10 wherein said quench zone contains residual aromatic oil as the immersion fluid, and said immersion fluid is maintained at a temperature in the range of about 300° to 500° F and below the thermal cracking temperature and at a pressure of at least 1500 psia; and wherein said clean product gas contains up to 5 mole % $C_1$–$C_{10}$ hydrocarbons.

12. The process of claim 10 wherein the clean product gas stream contains from about nil to 40.0 mole percent of $C_1$–$C_{10}$ hydrocarbons.

13. The process of claim 10 wherein said gas scrubbing zone comprises a nozzle scrubber.

* * * * *